(12) United States Patent
Avakian

(10) Patent No.: US 8,550,279 B2
(45) Date of Patent: Oct. 8, 2013

(54) ANTI-SIPHONING FUEL DEVICE, SYSTEM, AND METHOD

(76) Inventor: Gregory K. Avakian, Ormond Beach, FL (US)

( * ) Notice: Subject to any disclaimer, the term of this patent is extended or adjusted under 35 U.S.C. 154(b) by 971 days.

(21) Appl. No.: 12/400,418

(22) Filed: Mar. 9, 2009

(65) Prior Publication Data

US 2010/0224260 A1    Sep. 9, 2010

(51) Int. Cl.
*F16K 43/00*    (2006.01)

(52) U.S. Cl.
USPC ...... 220/86.3; 137/13; 137/15.09; 137/15.17; 137/215; 138/40; 138/42; 141/382

(58) Field of Classification Search
USPC ........ 220/86.3; 138/37–46; 137/215–218, 13, 137/15.01–15.26; 141/382
See application file for complete search history.

(56) References Cited

U.S. PATENT DOCUMENTS

| | | | | |
|---|---|---|---|---|
| 249,172 A * | 11/1881 | Grinnell | ...... | 210/445 |
| 1,512,065 A * | 10/1924 | Taylor | ...... | 220/86.3 |
| 1,725,537 A * | 8/1929 | Ossian | ...... | 220/86.3 |
| 1,808,245 A * | 6/1931 | Middleton | ...... | 220/86.3 |
| 1,813,554 A * | 7/1931 | Wickline | ...... | 220/86.3 |
| 1,873,590 A * | 8/1932 | Edward | ...... | 277/625 |
| 1,931,335 A | 10/1933 | Terry | | |
| 1,931,342 A * | 10/1933 | Broderick | ...... | 220/86.3 |
| 1,995,007 A * | 3/1935 | Myers | ...... | 220/86.3 |
| 2,037,499 A * | 4/1936 | Collard | ...... | 220/303 |
| 2,042,921 A * | 6/1936 | Arvintz | ...... | 210/232 |
| 2,066,202 A * | 12/1936 | Webb | ...... | 220/86.3 |
| 2,107,600 A | 2/1938 | Darms | | |
| 2,145,759 A * | 1/1939 | Fellows et al. | ...... | 220/86.3 |
| 2,147,755 A | 2/1939 | Roberts | | |
| 2,155,520 A * | 4/1939 | Wolff | ...... | 137/216 |
| 2,174,743 A * | 10/1939 | Groeniger | ...... | 137/217 |
| 2,216,846 A * | 10/1940 | Lewis | ...... | 48/189.4 |
| 2,281,448 A * | 4/1942 | Mathey | ...... | 220/86.3 |
| 2,347,988 A * | 5/1944 | Burke | ...... | 137/217 |
| 2,371,241 A * | 3/1945 | Jaffa | ...... | 220/86.3 |
| 2,371,449 A * | 3/1945 | Langdon | ...... | 137/852 |
| 2,372,545 A * | 3/1945 | Breedlove | ...... | 220/86.3 |
| 2,373,470 A * | 4/1945 | Hanke | ...... | 70/168 |
| 2,382,427 A * | 8/1945 | Langdon | ...... | 137/218 |
| 2,496,992 A * | 2/1950 | Glidden | ...... | 220/86.3 |
| 2,510,395 A * | 6/1950 | Goodrie | ...... | 239/428.5 |
| 2,548,734 A * | 4/1951 | Mathey | ...... | 220/86.2 |
| 2,598,002 A * | 5/1952 | Langdon | ...... | 137/218 |
| 2,631,049 A * | 3/1953 | McGillis et al. | ...... | 285/354 |
| 2,922,437 A * | 1/1960 | Rippingilla | ...... | 137/844 |
| 3,002,649 A * | 10/1961 | Turley | ...... | 220/86.3 |
| 3,016,161 A * | 1/1962 | Peplin | ...... | 220/86.2 |
| 3,410,939 A * | 11/1968 | Driza et al. | ...... | 264/150 |

(Continued)

FOREIGN PATENT DOCUMENTS

GB    739386    4/1954

*Primary Examiner* — J. Gregory Pickett
*Assistant Examiner* — Ned A Walker
(74) *Attorney, Agent, or Firm* — Bryan Cave LLP

(57) ABSTRACT

An anti-siphoning fuel system that includes a fuel inlet, a fuel tank, at least one fill tube or hose connecting the fuel inlet to the fuel tank such that fuel may flow from the fuel inlet to the fuel tank, and an anti-siphoning element or device coupled to the fill tube or hose that may be installed in existing boats or cars and obstructs a siphoning hose inserted in to the fill tube or hose from entering the fuel tank.

1 Claim, 3 Drawing Sheets

(56) References Cited

U.S. PATENT DOCUMENTS

| | | | |
|---|---|---|---|
| 3,463,159 A * | 8/1969 | Heimlich | 604/247 |
| 3,631,880 A * | 1/1972 | Hansel | 137/172 |
| 3,888,381 A | 6/1975 | Russell, Jr. | |
| 3,902,518 A * | 9/1975 | Fischer | 137/215 |
| 3,920,145 A | 11/1975 | McGregor et al. | |
| 3,951,297 A | 4/1976 | Martin | |
| 3,991,792 A * | 11/1976 | Kettler | 138/108 |
| 4,122,968 A * | 10/1978 | Germain | 220/86.2 |
| 4,286,632 A * | 9/1981 | Abel | 141/18 |
| 4,295,577 A * | 10/1981 | Schmid et al. | 220/86.1 |
| 4,326,641 A | 4/1982 | Wilken | |
| 4,345,694 A | 8/1982 | Chambers | |
| 4,529,097 A * | 7/1985 | Larson | 220/86.2 |
| 4,610,284 A * | 9/1986 | Bartholomew | 141/302 |
| 4,630,748 A | 12/1986 | Keller | |
| 4,650,087 A * | 3/1987 | White | 220/86.3 |
| 4,653,539 A * | 3/1987 | Bell | 137/860 |
| 4,726,390 A * | 2/1988 | Franklin | 137/218 |
| 4,911,211 A * | 3/1990 | Andersen | 141/7 |
| 5,217,044 A * | 6/1993 | Schulte | 137/590 |
| 5,246,130 A * | 9/1993 | Mondt et al. | 220/88.2 |
| 5,303,842 A * | 4/1994 | Harp et al. | 220/562 |
| 5,327,871 A * | 7/1994 | Gryc | 123/510 |
| 5,363,878 A * | 11/1994 | Atkins | 137/526 |
| 5,409,042 A * | 4/1995 | Kirchner | 138/42 |
| 5,476,185 A | 12/1995 | Jimerson | |
| 5,592,964 A * | 1/1997 | Traylor | 137/216 |
| 5,640,991 A * | 6/1997 | King | 137/107 |
| 5,641,012 A * | 6/1997 | Silversides | 141/383 |
| 6,019,127 A * | 2/2000 | Orita et al. | 137/515.7 |
| 6,182,617 B1 * | 2/2001 | Bigcharles | 123/41.1 |
| D451,200 S * | 11/2001 | Johansen et al. | D24/197 |
| 6,394,128 B1 * | 5/2002 | Concialdi | 137/550 |
| 6,439,939 B1 * | 8/2002 | Jaeger | 440/88 R |
| 6,463,965 B1 * | 10/2002 | Rasche et al. | 141/65 |
| 6,612,621 B2 * | 9/2003 | Oberheide et al. | 285/252 |
| 6,837,256 B2 * | 1/2005 | Benjey | 137/15.26 |
| 6,959,727 B2 * | 11/2005 | Krishnamoorthy et al. | 137/588 |
| 7,011,103 B2 * | 3/2006 | Delgado | 137/15.18 |
| 7,040,360 B2 | 5/2006 | Watson | |
| 7,065,962 B2 * | 6/2006 | Boncodin | 60/310 |
| 7,108,293 B2 * | 9/2006 | Van Der Meijden et al. | 285/275 |
| 7,175,612 B2 * | 2/2007 | Felix et al. | 604/323 |
| 7,258,144 B2 * | 8/2007 | Barthod et al. | 141/286 |
| 7,404,498 B2 * | 7/2008 | Hattori et al. | 220/86.3 |
| 7,458,391 B2 * | 12/2008 | Krishnamoorthy et al. | 137/527.4 |
| D588,055 S * | 3/2009 | Moya | D12/400 |
| 7,503,343 B2 * | 3/2009 | Krishnamoorthy et al. | 137/588 |
| 7,721,902 B2 * | 5/2010 | Grote et al. | 220/86.3 |
| 8,122,904 B2 * | 2/2012 | Wholey et al. | 137/429 |
| 8,181,678 B2 * | 5/2012 | Ando et al. | 141/286 |
| 8,281,947 B2 * | 10/2012 | Walkowski et al. | 220/86.3 |
| 2002/0043802 A1 * | 4/2002 | Koster | 285/242 |
| 2003/0116202 A1 * | 6/2003 | Krishnamoorthy et al. | 137/593 |
| 2003/0201014 A1 * | 10/2003 | Krishnamoorthy et al. | 137/542 |
| 2004/0050428 A1 * | 3/2004 | Benjey | 137/592 |
| 2004/0089154 A1 * | 5/2004 | Le et al. | 95/287 |
| 2005/0028873 A1 * | 2/2005 | Martin et al. | 137/592 |
| 2005/0051236 A1 * | 3/2005 | Watson | 141/370 |
| 2005/0139271 A1 * | 6/2005 | Krishnamoorthy et al. | 137/592 |
| 2007/0054228 A1 * | 3/2007 | Fogliani et al. | 431/354 |
| 2008/0156800 A1 | 7/2008 | Mougenot | |
| 2008/0257426 A1 * | 10/2008 | Spink et al. | 137/527 |
| 2008/0283124 A1 * | 11/2008 | Hatchett et al. | 137/15.17 |
| 2009/0134159 A1 * | 5/2009 | Wholey et al. | 220/86.3 |
| 2009/0229675 A1 * | 9/2009 | Hoskisson et al. | 137/215 |
| 2009/0320956 A1 * | 12/2009 | Ando et al. | 141/60 |
| 2010/0193042 A1 * | 8/2010 | Keefer et al. | 137/215 |
| 2012/0298213 A1 * | 11/2012 | Forster et al. | 137/215 |

* cited by examiner

ANTI-SIPHONING FUEL DEVICE, SYSTEM, AND METHOD

FIELD OF THE INVENTION

The present invention is directed to anti-siphoning devices, in particular an improved anti-siphoning device for use in a motorized vehicle.

BACKGROUND OF THE INVENTION

It is recognized that fuel for motorized vehicles, such as boats and cars, can be scarce and expensive. As a result, it is not uncommon for people to attempt to siphon the fuel stored in the fuel tanks of motorized vehicles.

Siphoning of fuel from a fuel tank generally involves placing a hose through the filler tube inlet or opening and down into the fuel held within the fuel tank. A suction pressure is then applied to the opposite end of the hose such that fuel within the tank flows upwardly and out of the tank through the hose.

There are a number of known solutions to address this problem. One is to provide locks or other securing devices to the cap of a filler pipe. However, this solution does not prevent siphoning once the lock or cap is broken. Another, in applications such as cars, provides a hinged access door that incorporates a lock. Such an access door can be defeated in a short period of time with a screw driver or a small pry bar causing serious damage to the vehicle body and paint. As a result, a car owner is not only subject to the cost of repurchasing fuel but also repairing the damage to the vehicle. Yet another is to provide a device that is inserted in to the filler tube at the entrance of the filler tube or at a position in close proximity to the entrance of the filler tube. Numerous patents are directed to these types of devices, including British Patent Specification 739,386, U.S. Published Application 2008/0156800, and U.S. Pat. Nos. 1,931,335; 2,107,600; 2,145,759; 2,147,755; 3,888,381; 3,920,145; 3,951,297; 4,326,641; 4,345,694; 4,630,748; 5,476,185; and 7,040,360. These types of devices are deficient because they can be defeated by inserting an elongated element like a rod in the fill tube and applying sufficient force to puncture, dislodge, or destroy these types of anti-siphoning devices. Some of these devices can also be considered deficient because they can obstruct or deter the flow of fuel through the fill tube causing fuel to back up or collect in the fill tube. This can cause an unacceptable increase in the amount of time required to fill a fuel tank or trigger a fuel nozzle with an automatic cut off to prematurely stop dispensing fuel. If a fuel nozzle does not include an automatic cut off, the fuel can spill outside the vehicle and cause environmental damage, subjecting the vehicle operator to significant fines. Even if a fuel nozzle does include an automatic cut off, an anti-siphon device that is at the entrance of the filler tube can still cause fuel spill when the fuel nozzle dispenses fuel at a high rate, such as boat applications. An anti-siphon device used in this circumstance will cause a backflow of fuel, which the fuel nozzle cannot prevent from leaving the tank. Some of these devices are also deficient in that they have limited application. Devices that are inserted at the entrance of the filler tube are generally not useful with fuel systems that incorporate threading on the interior of the filler tube for attaching a fuel cap because such inserts can interfere with the ability of the filler tube threading to interact with the cap. U.S. Pat. No. 4,345,694 purports to address some of these deficiencies by incorporating an elastomeric element that is pressed against the walls of the filler tube. However, such an element would not prevent an individual from gaining access to the device with a rod and applying sufficient force to defeat the elastomeric element. Further, the effectiveness of the device depends upon the person installing the device sufficiently compressing the elastomeric element during installation to insure that there is sufficient friction between the elastomeric element and the filler tube.

What is needed is an anti-siphoning device and fuel system that inhibits the ability of a thief to defeat the anti-siphoning device. It would be beneficial if such a device and system could inhibit the ability of a thief to identify and locate the anti-siphoning device. It would also be beneficial if such a device could be easily implemented in existing vehicles.

SUMMARY OF THE INVENTION

These and other objects are achieved by providing an anti-siphoning fuel system that includes a fuel inlet, a fuel tank, at least one fill tube connecting the fuel inlet to the fuel tank such that fuel may flow from the fuel inlet to the fuel tank, and an anti-siphoning element or device coupled to the fill tube that obstructs a siphoning hose inserted in to the fill tube from entering the fuel tank. The fill tube comprises at least one bend between the fuel inlet and the anti-siphoning element or device.

It is another object of the invention for the anti-siphoning element or device to form a fuel flow path through which fuel may flow for storage in to the fuel tank and comprise at least one restriction element that projects into the fuel flow path and obstructs a siphoning hose inserted in to the fill tube from entering the fuel tank. The anti-siphoning element or device can further include at least one coupling element that couples the anti-siphoning element or device to the fill tube and encompass at least a portion of the fuel flow path.

It is yet another object of the invention for the anti-siphoning element or device to comprise a first coupling element that couples the anti-siphoning element to a first fill tube and a second coupling element that couples the anti-siphoning element to either an inlet to the fuel tank or a second fill tube. The first coupling element can comprise a first restriction element and the second coupling element can comprise a second restriction element. The first and second restriction elements can each further comprise one or more radial arms that are angularly offset relative to one another.

It is a further object of the present invention for the first coupling element to comprise an outer circumference that corresponds to the inner circumference of the first fill tube such that a portion of the first coupling element is disposed within the first fill tube. The second coupling element can comprise an outer circumference that corresponds to the inner circumference of either the inlet to the fuel tank or the second fill tube such that a portion of the second coupling element is disposed within either the inlet to the fuel tank or the second fill tube.

It is also objective of the present invention to provide an anti-siphoning device for use in the fuel system described above and a method for preventing the siphoning of fuel from a fuel tank in accordance with the steps described above.

Other objects of the invention and its particular features and advantages will become more apparent from consideration of the following drawings and accompanying description.

DETAILED DESCRIPTION OF THE INVENTION

The following detailed description illustrates the invention by way of example, not by way of limitation of the principles of the invention. This description will enable one skilled in the art to make and use the invention, and describes several embodiments, adaptations, variations, alternatives and uses of the invention, including what is presently believed to be the best mode of carrying out the invention.

Figure 1:
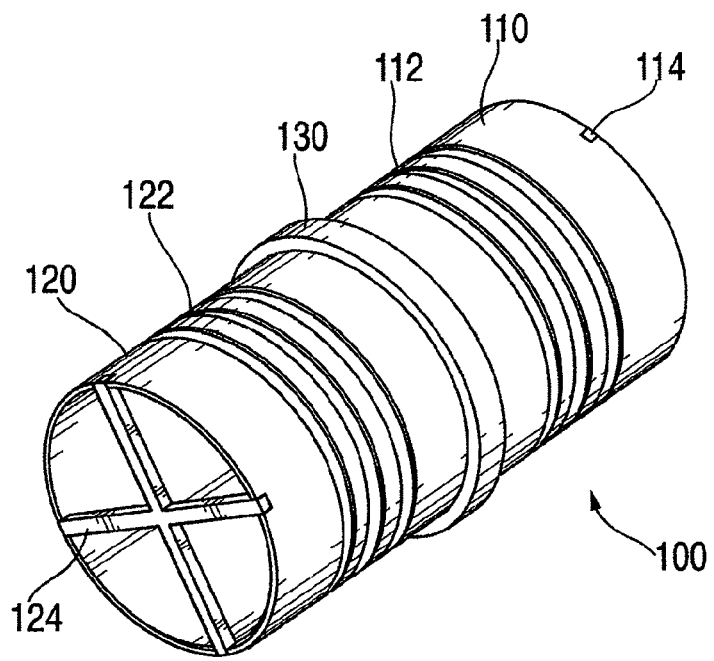
FIG. 1 is a perspective view of the anti-siphon device of the present invention.
Figure 2:
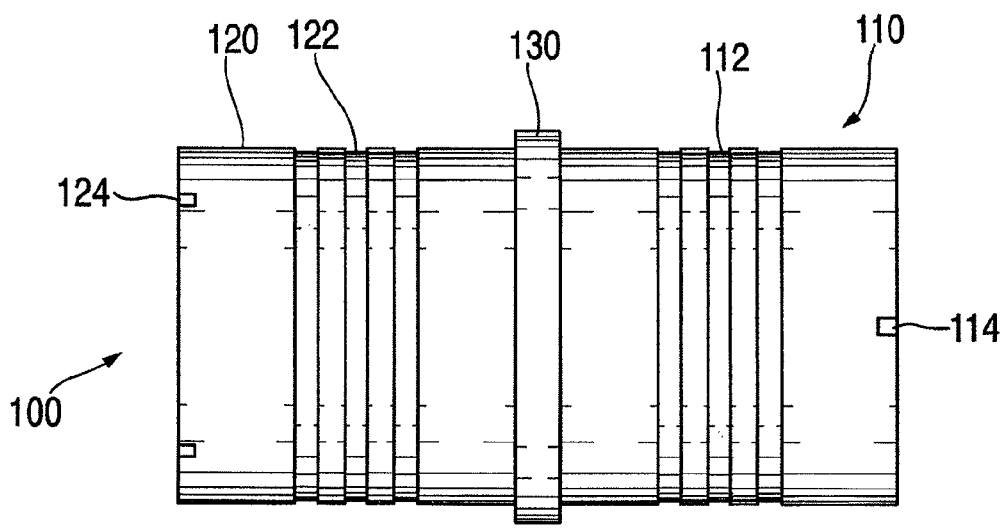
FIG. 2 is a top view of the anti-siphon device of FIG. 1.
Figure 3:
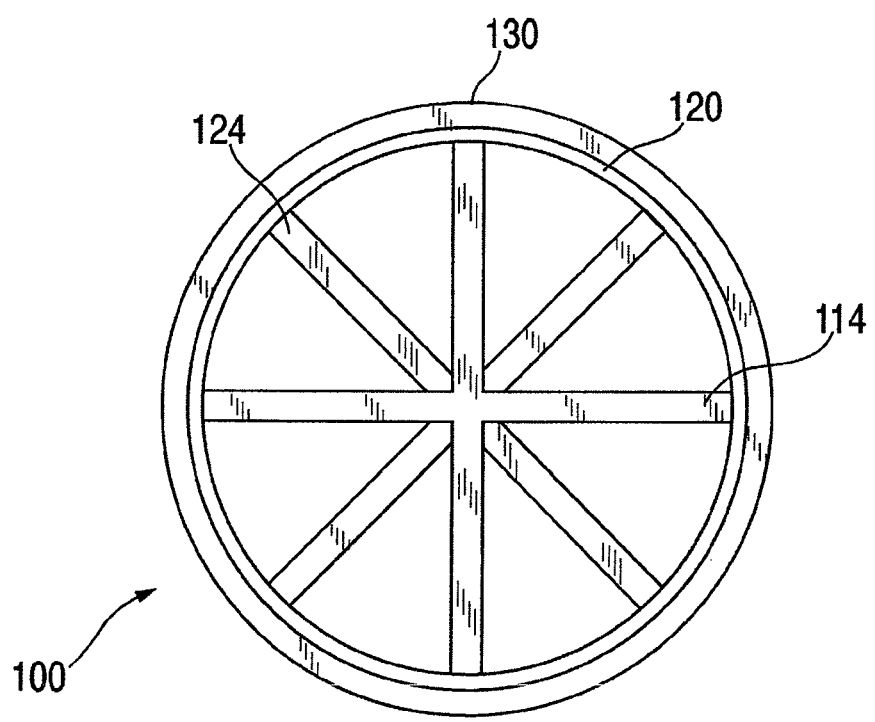
FIG. 3 is a front view of the anti-siphon device of FIG. 1.

FIGS. 1-3 depict a preferred embodiment of the anti-siphoning device 100 of the present invention. Anti-siphoning device 100 comprises proximal 110 and distal 120 coupling cylinders each of which comprise proximal 112 and distal 122 grooves respectively and stop ridge 130 disposed about the middle of device 100. The coupling cylinders create a flow path through which fuel may flow. The coupling cylinders enable device 100 to be coupled to a filler tube so that fuel may flow from the filler tube inlet to the fuel tank. To facilitate this coupling, the coupling cylinders can comprise an outer circumference that corresponds to the inner circumference of the filler tube.

Device 100 further comprises proximal 114 and distal 124 restriction elements disposed at the proximal and distal ends of device 100. As depicted, the restriction elements comprise a plurality of radially extending arms that are angularly off-set. As depicted in FIG. 3, the radially extending arms of proximal restriction element 114 are offset by forty-five degrees to the radially extending arms of distal restriction element 124. Angularly off-set radially extending arms prevent a siphon hose with small diameters from being fed through device 100. Ideally the radially extending arms are offset by forty-five degrees, however other angular relationships such as thirty degrees or sixty degrees can be utilized. While each restriction element is shown to comprise four radially extending arms, it is within the scope of the invention for the restriction elements to comprise one or more radially extending arms. Further, while device 100 is shown as comprising restriction elements at the proximal and distal ends of the device, the restriction elements can be located at other positions within the device, such as the center. Still further, while device 100 is shown as comprising two restriction elements with radially extending arms, it is within the scope of the invention for only one restriction element or more than two restriction elements to be incorporated in the device. It is also within the scope of the invention for restriction elements of other shapes and designs so long as the restriction elements inhibit the ability of a siphon hose from passing through device 100.

Figure 4:
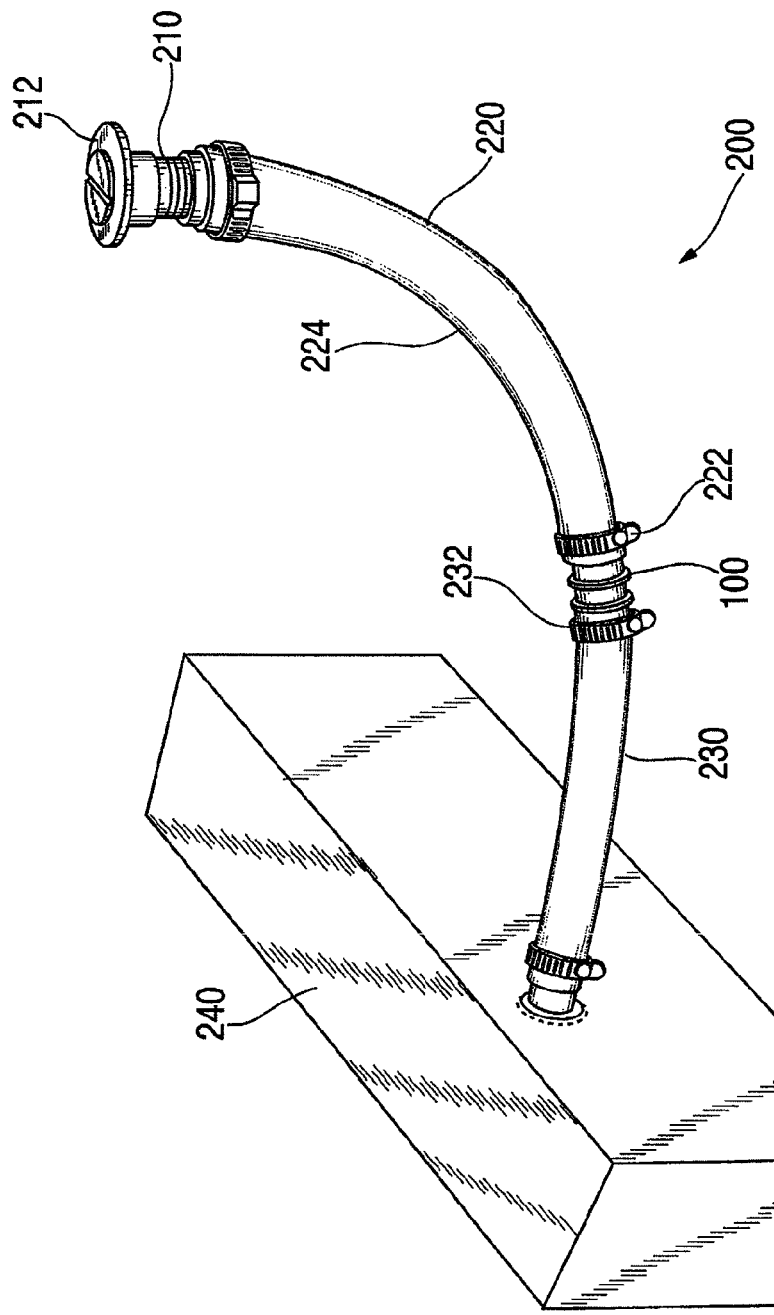
FIG. 4 is a depiction of the fuel system of the present invention incorporating the anti-siphoning device of FIG. 1.

FIG. 4 shows an anti-siphon fuel system 200 that incorporates anti-siphon device 100. Fuel system 200 comprises a filler tube inlet 210 with a cap 212, a first filler tube 220 coupled to the proximal end of device 100, a second filler tube 230 coupled to the distal end of device 100 and to an inlet for fuel tank 240. The filler tubes 220, 230 are coupled to device 100 using clamps 222, 232. When the filler tubes are made of a material such as rubber, clamps 222, 232 apply a force such that the rubber material is forced in to grooves 112, 122 providing a secure fit and coupling of the filler tubes to the device. Filler tubes 220, 230 can be made of other materials, such as steel or aluminum, and coupled to device 100 in other manners, such as friction fitting, welding and adhesive bonding. FIG. 4 also shows that first filler tube 220 has a bend or radius of curvature 224. The bend or radius of curvature can form an angle within the first filler tube of one section of the first filler tube relative to another section of the first filler tube that ranges from about 10° to about 170°, preferably about 30° to about 150°, more preferably about 45° to about 135°, most preferably about 60° to about 130°. The objective is for the bend or curvature in the first filler tube to be sufficient such that a thief is inhibited from inserting a tool, such as a rod, through the filler tube inlet and being able to damage or defeat device 100 with the tool. While FIG. 4 shows device 100 coupled to two filler tubes it is also within the scope of the present invention for device to be directly coupled to an inlet for filler tank 240.

The present anti-siphoning device and system provides a unique solution for preventing the theft of fuel from vehicles, such as a boat or car. Unlike prior known techniques, the disclosed anti-siphoning device can effectively prevent siphoning hoses from reaching a fuel tank and effectively incorporated into existing vehicles. This device allows the vehicle owner to place an anti-siphoning device at a location remote to the filler tube inlet, diminishing the ability of a thief to detect and locate the device. Further, by utilizing a filler tube with a bend or radius of curvature between the anti-siphoning device and the filler tube inlet, a thief is inhibited from inserting a tool into the filler tube for the purpose of damaging or defeating the anti-siphoning device.

The present invention has been described above in terms of a presently preferred embodiment so that an understanding of the present invention can be conveyed. However, there are alternative arrangements for an anti-siphoning device and an anti-siphoning fuel system within the scope of the present invention. The scope of the present invention should therefore not be limited by the embodiments discussed, but rather it should be understood that the present invention is widely applicable anti-siphoning devices and an anti-siphoning fuel systems in general. All modifications, variations, or equivalent elements and implementations that are within the scope of the claims should therefore be considered within the scope of this invention.

What is claimed is:

1. A method for retrofitting a vehicle or vessel with an anti-theft device so as to prevent the siphoning of fuel from a fuel tank that is connected to a fuel inlet through a fill hose, the method comprising the steps of:

cutting the fill hose along the circumference of said hose at a location that is substantially remote from the fuel inlet so as to separate a first portion of the fill hose that is coupled to the fuel tank from a second portion of the fill hose that is coupled to the fuel inlet;

sliding a first clamp onto the first portion of the fill hose, and sliding a second clamp onto the second portion of the fill hose;

inserting the anti-theft device between the first and second portions of the fill hose, the anti-theft device comprising a tubular body having an outer circumference that corresponds with an inner circumference of the fill hose, a stop ridge interposed between a first and second cylindrical coupling elements, wherein each one of the coupling elements comprises an inner restriction element having a plurality of radial arms disposed at a distal end of the tubular body and wherein the inner restriction elements of the first coupling element are angularly off-set relative to the inner restriction elements of the second coupling element, the first coupling element being inserted into the first portion of the fill hose and the second coupling element being inserted into the second portion of the fill hose leaving the stop ridge exposed; and tightening the first clamp at a first point proximal to the center of the first coupling element so as to secure the first portion of the fill hose to the anti-theft device, and tightening the second clamp at a second point proximal to the center of the second coupling element so as to secure the second portion of the fill hose to the anti-theft device.

\* \* \* \* \*